UNITED STATES PATENT OFFICE.

FREDERIC J. SMITH, OF ELIZABETH, NEW JERSEY, ASSIGNOR TO WILLIAM H. BOWKER, OF BOSTON, MASSACHUSETTS.

BORDEAUX MIXTURE AND METHOD OF PREPARING SAME.

SPECIFICATION forming part of Letters Patent No. 718,538, dated January 13, 1903.

Application filed June 5, 1901. Serial No. 63,308. (No specimens.)

*To all whom it may concern:*

Be it known that I, FREDERIC J. SMITH, a citizen of the United States, residing at Elizabeth, in the county of Union and State of New Jersey, have invented certain new and useful Improvements in Bordeaux Mixture and Method of Preparing the Same, of which the following is a specification.

My invention relates to that class of chemical mixtures known as "insecticides" or "germicides," and particularly to the "Bordeaux mixture," so called; and its object is to produce an improvement therein, as will be hereinafter more fully set forth.

The usual method of preparing the Bordeaux mixture now practiced is to make a solution of blue vitriol, also a separate solution of caustic lime and water, commonly known as "milk of lime," and then to put the two mixtures together and apply.

I have discovered that unslaked calcium carbid may be ground and mixed dry with blue vitriol, also dry, and that the mixture thus made may be stored or transported in air-tight vessels or packages and kept until it is wanted for use, when water is added to it in the usual manner.

I have further discovered that when the calcium carbid in the mixture is slaked by the addition of water, as described, the lime reacts upon the copper sulfate, producing the desired copper hydroxid, also that the heat produced by slaking in a large measure passes off with the escape of the acetylene gas. By reason of this the copper hydroxid is preserved and possesses its active character as an insecticide, whereas if ordinary lime were slaked in the presence of blue vitriol the hydroxid would be decomposed and its value as an insecticide lost.

I will now describe my improved method of preparing my improved compound.

The blue vitriol is first heated to 212° Fahrenheit in an open vessel, with occasional stirring, until the water of crystallization has been driven off so far as is possible at that temperature, when it will be found that the blue vitriol has lost about twenty-eight per cent. of its original weight. Further, it will be found that the original crystals have crumbled, yielding a bluish-white and very hygroscopic powder. The calcium carbid is now mixed in the form of a powder with the powdered blue vitriol prepared as above described. This latter being very hygroscopic will take up any atmospheric moisture that may exist in the package in which the mixture is packed, and thereby prevent the calcium carbid from becoming air-slaked by any moisture that may have accidentally found access.

In practice I have found the following proportions of ingredients make a satisfactory mixture: A quantity of crystallized copper sulfate weighing one hundred pounds is heated, as herein described, until it loses about twenty-eight per cent. of its original weight, due to the loss of water of crystallization, leaving seventy-two pounds of dehydrated blue vitriol. Twenty-eight pounds of powdered calcium carbid is then mixed with the seventy-two pounds of blue vitriol, care being taken to avoid undue exposure to air while mixing.

When the Bordeaux insecticide is wanted for use, one part by weight of the described mixture of powdered calcium carbid and blue vitriol is mixed with from fifteen to twenty parts of water in a suitable vessel. The escaping gas greatly assists in the mixing, and a Bordeaux mixture is produced which is very suitable for spraying purposes. The Bordeaux mixture thus prepared will be brownish in color instead of the familiar blue; but after application the blue color will reappear, the change being due, according to my observation, to the mechanical separation of particles of carbon, which come from slaking the calcium carbid.

I claim—

1. The improvement in the art of preparing Bordeaux mixture which consists in subjecting blue vitriol to heat as described, whereby the water of crystallization is driven off and the crystals crumbled to a powder, and mixing therewith powdered calcium carbid.

2. The improved product herein described consisting of a mixture of powdered blue vitriol and powdered calcium carbid.

In testimony whereof I have hereunto subscribed my name this 14th day of May, 1901.

FREDERIC J. SMITH.

Witnesses:
HENRY J. MILLER,
HANNAH N. F. MILLER.